US009026063B2

(12) United States Patent
Labaziewicz et al.

(10) Patent No.: US 9,026,063 B2
(45) Date of Patent: May 5, 2015

(54) COMPLEMENTARY METAL-OXIDE SEMICONDUCTOR DIRECT CURRENT TO DIRECT CURRENT CONVERTER

(75) Inventors: Andrew Labaziewicz, Jamestown, NC (US); Manbir Nag, Oak Ridge, NC (US)

(73) Assignee: TriQuint Semiconductor, Inc., Hillsboro, OR (US)

( * ) Notice: Subject to any disclaimer, the term of this patent is extended or adjusted under 35 U.S.C. 154(b) by 1010 days.

(21) Appl. No.: 13/109,958

(22) Filed: May 17, 2011

(65) Prior Publication Data

US 2012/0293151 A1 Nov. 22, 2012

(51) Int. Cl.
| | | |
|---|---|---|
| H04B 1/44 | (2006.01) | |
| H04M 1/00 | (2006.01) | |
| H01L 29/12 | (2006.01) | |
| H01L 29/786 | (2006.01) | |
| H01L 29/74 | (2006.01) | |
| H01L 27/082 | (2006.01) | |
| H03F 3/04 | (2006.01) | |
| H03F 3/16 | (2006.01) | |
| H03F 3/60 | (2006.01) | |
| H02M 3/07 | (2006.01) | |

(52) U.S. Cl.
CPC ...................................... *H02M 3/07* (2013.01)

(58) Field of Classification Search
USPC ......... 455/78, 82, 83, 550.1; 257/43, 71, 104, 257/107, 124, 213, 300, 516, 565, 566, 257/653; 330/250, 264, 277, 286
See application file for complete search history.

(56) References Cited

U.S. PATENT DOCUMENTS

| | | | |
|---|---|---|---|
| 5,306,954 A | 4/1994 | Chan | |
| 6,407,618 B1 * | 6/2002 | Taft et al. | 327/534 |
| 6,424,202 B1 | 7/2002 | Bartlett | |
| 7,123,898 B2 | 10/2006 | Burgener | |
| 7,936,187 B1 * | 5/2011 | Wu et al. | 327/94 |
| 2003/0214347 A1 * | 11/2003 | Nuzzarello et al. | 327/536 |
| 2006/0082410 A1 * | 4/2006 | Khan et al. | 327/539 |
| 2006/0097773 A1 * | 5/2006 | Kang et al. | 327/536 |
| 2009/0058483 A1 * | 3/2009 | Shin et al. | 327/175 |
| 2009/0237149 A1 * | 9/2009 | Ueda | 327/536 |
| 2010/0244935 A1 * | 9/2010 | Kim et al. | 327/536 |
| 2011/0018751 A1 * | 1/2011 | Lee et al. | 341/122 |
| 2011/0238203 A1 * | 9/2011 | Hao et al. | 700/121 |
| 2011/0310659 A1 * | 12/2011 | Seol et al. | 365/149 |
| 2012/0154023 A1 * | 6/2012 | Pan et al. | 327/536 |
| 2013/0307616 A1 * | 11/2013 | Berchtold et al. | 330/127 |

OTHER PUBLICATIONS

Sipex Corporation; Micro Power Inverting Charge Pump; SP682; Sipex product data sheet; May 20, 2004.
Cha, Jeongwon, et al.; A Charge-Pump Based 0.35-um CMOS RF Switch Driver for Multi-Standard Operations; IEEE Transactions on Circuits and Systems—I; vol. 56, No. 5; May 2009.

* cited by examiner

*Primary Examiner* — Andrew Wendell
(74) *Attorney, Agent, or Firm* — Schwabe Williamson & Wyatt (57) ABSTRACT

Disclosed embodiments include a direct current to direct current (DC-DC) converter including one or more charge pumps and configured to receive an input voltage and a first clock signal and a second clock signal. The first clock signal and second clock signal may be non-overlapping, and each may alternate between a ground voltage and a first voltage. The DC-DC converter may be configured to produce an output voltage over the clock cycle that has a negative polarity with a magnitude substantially equal to a sum of magnitudes of the input voltage and an integer multiple of the first voltage, the integer multiple being equal to a number of the one or more charge pumps in the DC-DC converter.

17 Claims, 5 Drawing Sheets

COMPLEMENTARY METAL-OXIDE SEMICONDUCTOR DIRECT CURRENT TO DIRECT CURRENT CONVERTER

FIELD

Embodiments of the present disclosure relate generally to the field of direct current to direct current (DC-DC) converters, and more particularly to complementary metal-oxide-semiconductor (CMOS) DC-DC converters.

BACKGROUND

Direct current to direct current (DC-DC) converters are used to convert a direct current source from one voltage level to another. DC-DC converters are widely used in portable electronics, such as mobile phones, personal data assistants (PDAs), and laptops, to convert a voltage supplied by a battery into a supply voltage or control signal used by other functional blocks.

DC-DC converters may be used to generate control signals for radio-frequency (RF) antenna switches. Traditionally, RF antenna switches are used in pairs with one of the switches being in series with an RF signal and the other switch being in shunt with the RF signal. These RF antenna switches are manufactured using depletion-mode pseudomorphic high electron mobility transistor (pHEMT) devices in a gallium arsenide (GaAs) die.

These pHEMT-device RF antenna switches are switched off with a negative gate voltage, and switched on with a positive gate voltage. As such, complementary control signals are needed for the pair of RF antenna switches so that one of the devices in the pair is on while the other is off. Furthermore, level-shifters are used to translate a positive voltage reference and a negative voltage reference into the positive gate voltage and negative gate voltage to ensure that the correct voltage levels are supplied to gates of the RF antenna switches.

Currently, one of the methods to generate this negative voltage reference is to design a positive voltage doubler in the antenna switch GaAs die and use a large amount of capacitance to convert this positive voltage into the appropriate negative voltage. This design uses a large amount of costly GaAs die area, since complementary n-type and p-type switching devices are not available in GaAs technology. Additionally, the positive voltage doubler design results in a large current drain due to the extra circuitry needed to attain functionality using only one type of semiconductor device and the gate leakage current that is an artifact of the pHEMT technology. Furthermore, there is wide variation in the performance of the generated negative voltage. This variation negatively affects the overall performance of an antenna switch module incorporating such a design.

BRIEF DESCRIPTION OF THE DRAWINGS

Embodiments are illustrated by way of example and not by way of limitation in the figures of the accompanying drawings, in which like references indicate similar elements.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present disclosure; however, the order of description should not be construed as to imply that these operations are necessarily order dependent. In particular, these operations need not be performed in the order of presentation.

The phrase "in various embodiments" is used repeatedly. The phrase generally does not refer to the same embodiments; however, it may. The terms "comprising," "having," and "including" are synonymous, unless the context dictates otherwise.

In providing some clarifying context to language that may be used in connection with various embodiments, the phrases "A/B" and "A and/or B" mean (A), (B), or (A and B); and the phrase "A, B, and/or C" means (A), (B), (C), (A and B), (A and C), (B and C) or (A, B and C).

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled to each other.

Figure 1:
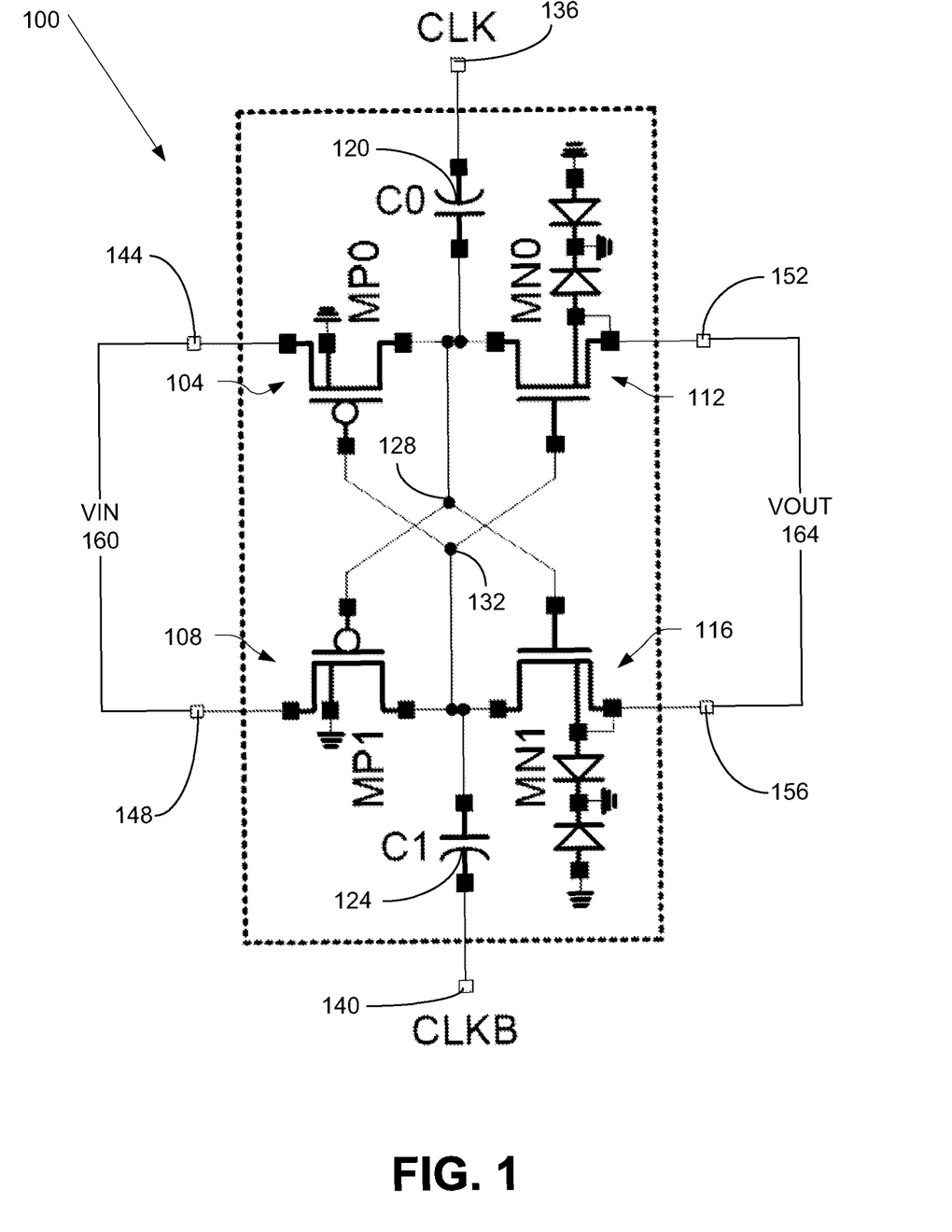
FIG. 1 schematically illustrates a circuit, in accordance with various embodiments.

Various embodiments herein generally provide a DC-DC converter including one or more charge pumps. FIG. 1 schematically illustrates a DC-DC converter 100 in accordance with various embodiments. DC-DC converter 100 may also be referred to as charge pump 100. In various embodiments, charge pump 100 may be a negative charge pump. The DC-DC converter 100 may be implemented using complementary metal-oxide-semiconductor (CMOS) technology and may include a plurality of CMOS devices, such as p-type metal-oxide-semiconductor (PMOS) transistors and/or n-type metal-oxide-semiconductor (NMOS) transistors. As depicted in FIG. 1, the DC-DC converter 100 includes p-type transistors MP0 104 and MP1 108, n-type transistors MN0 112 and MN1 116, and capacitors C0 120 and C1 124. In some embodiments, n-type transistors MN0 112 and MN1 116 may be triple-well NMOS transistors.

In DC-DC converter 100, a source terminal of MP0 104, a drain terminal of MN0 112, a gate terminal of MP1 108, and a gate terminal of MN1 116 may all be coupled with a first node 128. Additionally, a source terminal of MP1 108, a drain terminal of MN1 116, a gate terminal of MP0 104, and a gate terminal of MN0 112 may all be coupled with a second node 132. Capacitor C0 120 may be coupled with the first node 128 and a first clock terminal 136, while capacitor C1 124 may be coupled with the second node 132 and a second clock terminal 140. A drain terminal of MP0 104 may be coupled with a first input terminal 144, while a drain terminal of MP1 108 may be coupled with a second input terminal 148. Similarly, a source terminal of MN0 112 may be coupled with a first output terminal 152, while a source terminal of MN1 116 may be coupled with a second output terminal 156. While the disclosure may refer specifically to the source and/or drain terminals of transistor elements, it will be apparent to one skilled in the art that the coupling of the source and drain terminals may be reversed while maintaining the functionality of the DC-DC converter 100.

In some embodiments, each of transistors MP0 104, MP1 108, MN0 112, and MN1 116 may comprise one switching device, e.g., one transistor, as depicted in FIG. 1. In other embodiments, one or more of MP0 104, MP1 108, MN0 112, and MN1 116 may comprise a plurality of switching devices, e.g., a plurality of transistors, coupled with one another in parallel.

Figure 2:
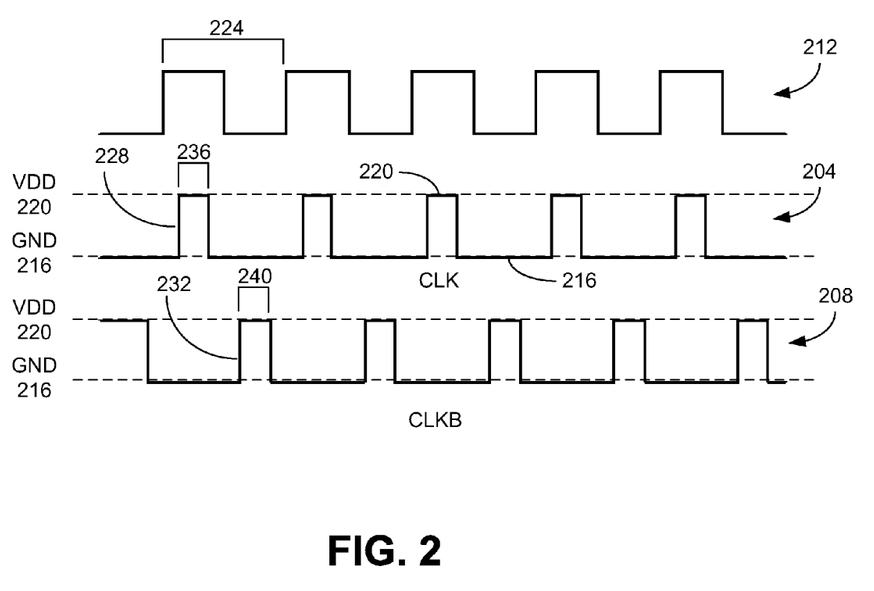
FIG. 2 illustrates clock signals, in accordance with various embodiments.

The DC-DC converter 100 may be driven by a two-phase clock including two clock signals; CLK, received at first clock terminal 136, and CLKB, received at second clock terminal 140. FIG. 2 illustrates example waveforms that represent the two clock signals of the two-phase clock. In particular, FIG. 2 illustrates a first clock signal 204, which may correspond to CLK, and a second clock signal 208, which may correspond to CLKB. Accordingly, the first clock signal 204 and the second clock signal 208 may also be referred to as CLK 204 and CLKB 208, respectively. In some embodiments, CLK 204 and CLKB 208 may be generated from a main clock signal 212. In various embodiments, the clock signals 204 and 208 may be buffered prior to being provided to DC-DC converter 100.

CLK 204 and CLKB 208 may each alternate between a ground voltage (GND) 216 and a first voltage 220 over a clock cycle 224. The first voltage 220 may also be referred to herein as VDD 220. CLK 204 and CLKB 208 may each have a clock pulse 228 or 232, respectively, during each clock cycle 224 in which the voltage of the clock signal changes from the ground voltage 216 to the first voltage 220 for a pulse duration 236 or 240, respectively.

In some embodiments, CLK 204 and CLKB 208 may have non-overlapping clock pulses 228 or 232, respectively, as depicted in FIG. 2. That is, clock pulse 228 and clock pulse 232 may occur at different times during the clock cycle 224, so that clock pulse 232 does not occur during the pulse duration 236 of clock pulse 228, and clock pulse 228 does not occur during the pulse duration 240 of clock pulse 232.

Referring again to FIG. 1, the DC-DC converter 100 may receive an input voltage 160 between the first input terminal 144 and the second input terminal 148. The input voltage 160 may be a DC voltage. In some embodiments, the input voltage 160 may be a ground voltage. The DC-DC converter 100 may generate an output voltage 164, between the first output terminal 152 and the second output terminal 156, based on the input voltage 160 and the clock signals 204 and 208. In various embodiments, the DC-DC converter 100 may generate the output voltage 164 to be a DC voltage with a negative polarity and a magnitude substantially equal to the sum of the magnitudes of the input voltage 160 and the first voltage 220 (i.e., −(VIN+VDD)) throughout the clock cycle 224. In embodiments where the input voltage 160 is ground, the output voltage 164 may be substantially equal to −VDD. The actual magnitude of output voltage 164 may be slightly less than the above amounts due to current leakage and other factors.

To illustrate the functionality of DC-DC converter 100, assume that input voltage 160 is ground (GND), and that capacitors C0 120 and C1 124 are fully discharged to ground. During the first clock pulse 228 of CLK 204, CLK 204 is high (VDD) and CLKB 208 is low (GND). The voltage difference ($V_{12}$) between the first node 128 and the second node 132 is VDD. Hence, MP0 104 is turned on to transfer charge between input voltage 160 and the first node 128, while MP1 108 is turned off to cut off the path from the second node 132 back to input voltage 160. The voltage at the first node 128 will settle to ground while the voltage at the second node 132 will settle to −VDD. Similarly, during the first clock pulse 232 of CLKB 208, when CLK 204 is low (ground) and CLKB 208 is high (VDD), $V_{12}$ becomes −VDD. MP0 104 is turned off to cut off the path from the first node 128 back to input voltage 160, while MP1 108 is turned on to transfer charge between input voltage 160 and the second node 132. The voltage at the first node 128 will settle to −VDD while the voltage at the second node 132 will settle to ground.

During the next clock pulse 228 of CLK 204, $V_{12}$ is −VDD. Therefore, MN0 112 is turned on to transfer charge between the first node 128 and first output terminal 336, while MN1 116 is turned off to cut off the path from the output voltage 164 back to the second node 132. The output voltage (VOUT) 164 will settle to −VDD. Similarly, during the next clock pulse 232 of CLKB 208, $V_{12}$ is VDD. Therefore, MN0 112 is turned off to cut off the path from output voltage 164 back to the first node 128, while MN1 116 is turned on to transfer charge between the second node 132 and second output terminal 156. Accordingly, VOUT 164 will settle to −VDD.

Figure 3:
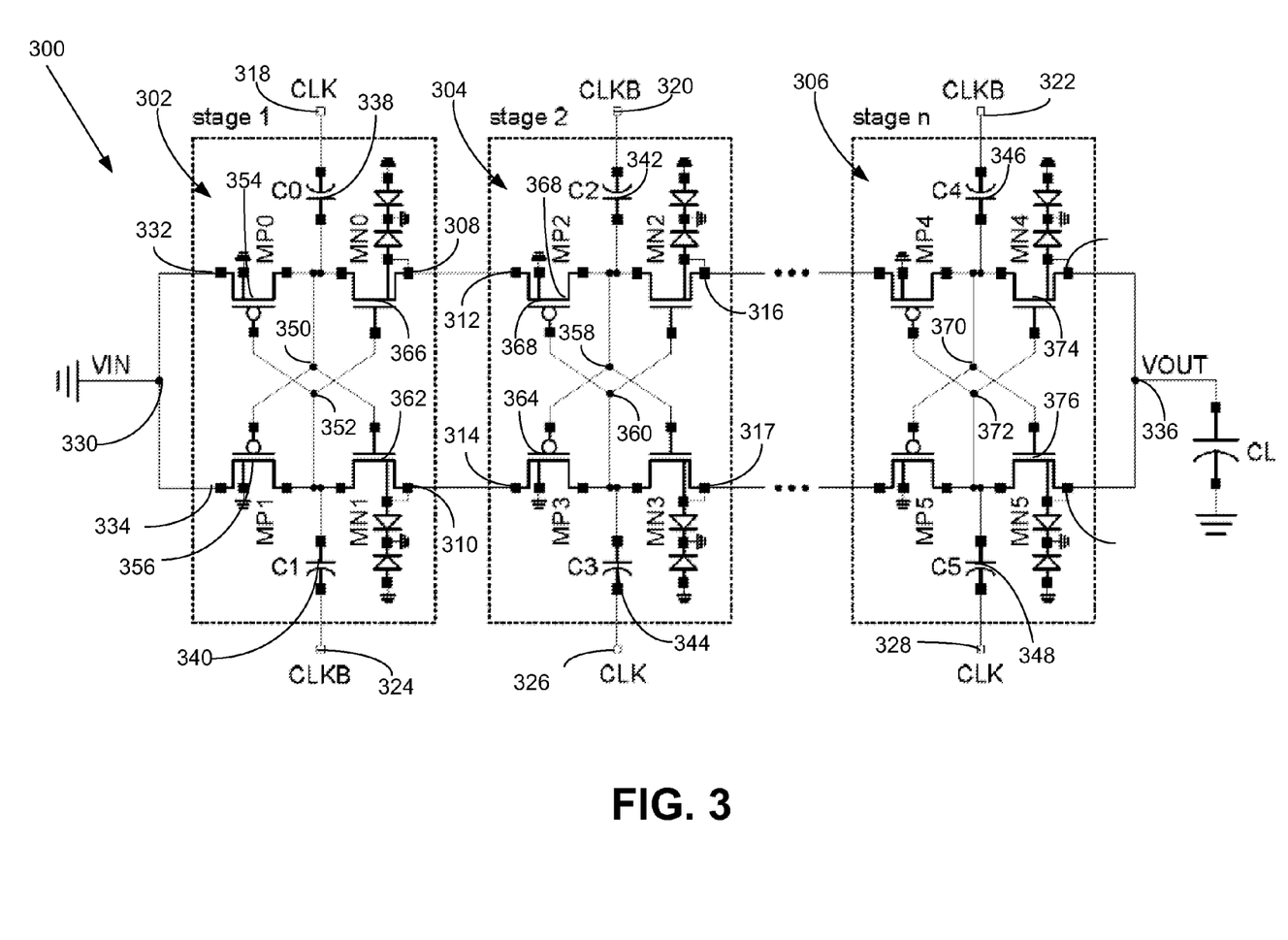
FIG. 3 schematically illustrates a circuit, in accordance with various embodiments.

Some embodiments of the DC-DC converter may include a plurality of charge pumps, such as charge pump 100, coupled together in series, i.e., cascaded. For example, FIG. 3 illustrates an embodiment of a DC-DC converter 300 that includes a number, n, of charge pumps, including a first charge pump 302, a second charge pump 304, and an nth charge pump 306. Each charge pump shown in FIG. 3 has the same topology as charge pump 100 shown in FIG. 1. The first charge pump 302, second charge pump 304, and nth charge pump 306 may be coupled together in series. That is, a first output terminal 308 and a second output terminal 310 of the first charge pump 302 may be coupled with the a first input terminal 312 and a second input terminal 314, respectively, of the second charge pump 304. Similarly, a first output terminal 316 and a second output terminal 317 of the second charge pump 304 may be coupled with a first input terminal and a second input terminal of a third charge pump (not pictured). Subsequent charge pumps may be coupled with other charge pumps in a similar manner.

First charge pump 302, second charge pump 304, and nth charge pump 306 may each have a first clock terminal 318, 320, or 322, respectively, and a second clock terminal 324, 326, or 328, respectively. The first charge pump may receive CLK 204 at the first clock terminal 318 and CLKB 208 at the second clock terminal 324. Conversely, the second charge pump may receive CLK 204 at the second clock terminal 326 and CLKB 208 at the first clock terminal 320. The coupling of CLK 204 and CLKB 208 may alternate in a similar manner for subsequent charge pumps to pass charge on to the next charge pump, as will be explained below.

In various embodiments, DC-DC converter 300 may be configured to receive an input voltage, VIN, at an input node 330 coupled with a first input terminal 332 and a second input terminal 334 of the first charge pump 302. In some embodiments, the input node 330 of the DC-DC converter 300 may be coupled with a ground terminal, as depicted in FIG. 3. In other embodiments, the input voltage may be any suitable supply voltage. In various embodiments, the DC-DC converter 300 may produce a DC output voltage, VOUT, at an output node 336, that has a negative polarity with a magnitude throughout the clock cycle that is substantially equal to a sum of magnitudes of the input voltage (VIN) and an integer multiple of the first voltage (VDD) (i.e., −(VIN+n(VDD))), where the integer multiple is equal to the number, n, of charge pumps in the DC-DC converter. In embodiments where the input voltage is ground, the output voltage may be substantially equal to n(−VDD). The actual magnitude of the output voltage may be slightly less than the above amounts due to current leakage and other factors.

The first charge pump 302 of DC-DC converter 300 operates in a similar manner to DC-DC converter 100, as described above in the discussion of FIG. 1. After the first charge pump 302, each subsequent charge pump receives the output voltage of the previous charge pump as an input voltage and produces an output voltage that is more negative than the received input by the magnitude of VDD.

To illustrate the functionality of DC-DC converter 300, assume that input voltage, VIN, at input node 330 is ground (GND), and that all capacitors 338, 340, 342, 344, 346, and 348 are fully discharged to ground. As explained above for DC-DC converter 100, during the first clock pulse 228 of CLK 204, CLK 204 is high (VDD) and CLKB 208 is low (GND). The voltage difference ($V_{12}$) between a first node 350 and a second node 352 is VDD. Hence, MP0 354 is turned on to transfer charge between input node 330 and the first node 350, while MP1 356 is turned off to cut off the path from the second node 352 back to input node 330. The voltage at the first node 350 will settle to ground while the voltage at the second node 352 will settle to −VDD. Similarly, during the first clock pulse 232 of CLKB 208, when CLK 204 is low (ground) and CLKB 208 is high (VDD), $V_{12}$ becomes −VDD. MP0 354 is turned off to cut off the path from the first node 350 back to input node 330, while MP1 356 is turned on to transfer charge between input node 330 and the second node 352. The voltage at the first node 350 will settle to −VDD while the voltage at the second node 352 will settle to ground.

In the next pumping stage, during the clock pulse 228 of CLK 204, since $V_{12}$ is VDD and the voltage difference ($V_{34}$) between a third node 358 and a fourth node 360 is −VDD, MN1 362 and MP3 364 are turned on to transfer charge between the second node 352 and the fourth node 360. MN0 366 and MP2 368 are turned off to cut off the path from the third node 358 back to the first node 350. The voltage at the fourth node 360 will settle to −VDD, while the voltage at the third node 358 will settle to −2VDD. Similarly, during the clock pulse 232 of CLKB 208, $V_{12}$ is −VDD and $V_{34}$ is VDD. Hence, MN1 362 and MP3 364 are turned off to cut off the path from the fourth node 360 to the second node 352, while MN0 366 and MP2 368 are turned on to transfer charge between the first node 350 and the third node 358. The fourth node 360 will settle to −2VDD, while the third node 358 will settle to −VDD. Successive pumping stages operate in a similar manner.

At the output stage, during the clock pulse 228 of CLK 204, the voltage difference ($V_{56}$) between a fifth node 370 and a sixth node 372 of the nth charge pump 306 is −VDD. Therefore, MN4 374 is turned on to transfer charge between the fifth node 370 and output node 336, while MN5 376 is turned off to cut off the path from the output node 336 back to the sixth node 372. The output voltage, VOUT, will settle to n(−VDD). Similarly, during the clock pulse 232 of CLKB 208, $V_{56}$ is VDD. Therefore, MN4 374 is turned off to cut off the path from output node 336 back to the fifth node 370 while MN5 376 is turned on to transfer charge between the sixth node 372 and output node 336. Accordingly, VOUT will settle to n(−VDD).

In various embodiments, the DC-DC converter, as described above, may produce a negative DC output voltage using a CMOS process. The CMOS process may provide cost and space benefits compared with a GaAs process. However, in some embodiments the CMOS DC-DC converter may be coupled with a functional block designed in GaAs process, such as an RF switch. Additionally, DC-DC converters 100 and 300 provide many advantages since they may use a two-phase clock, may receive an input voltage of ground, and may include only four switching elements and two capacitors for each charge pump.

Notably, with the design of DC-DC converters 100 and 300, each of the transistors in DC-DC converters 100 and 300 may manifest a gate-source junction voltage and a gate-drain junction voltage that is equal to or less than the first voltage 220 (VDD) of the clock signals 204 and 208 throughout the clock cycle. Therefore, the gate-source junction voltage and gate-drain junction voltage may not exceed the breakdown voltage of the transistors. In some embodiments, this transistor breakdown voltage may be about 7 volts. Instead, the number of charge pumps, n, that may be used in the DC-DC converter 300 is limited by the reverse breakdown voltage of a pn-junction for the particular process used. In embodiments that utilize triple-well NMOS transistors, the reverse breakdown voltage may be about 12 volts.

Figure 4:
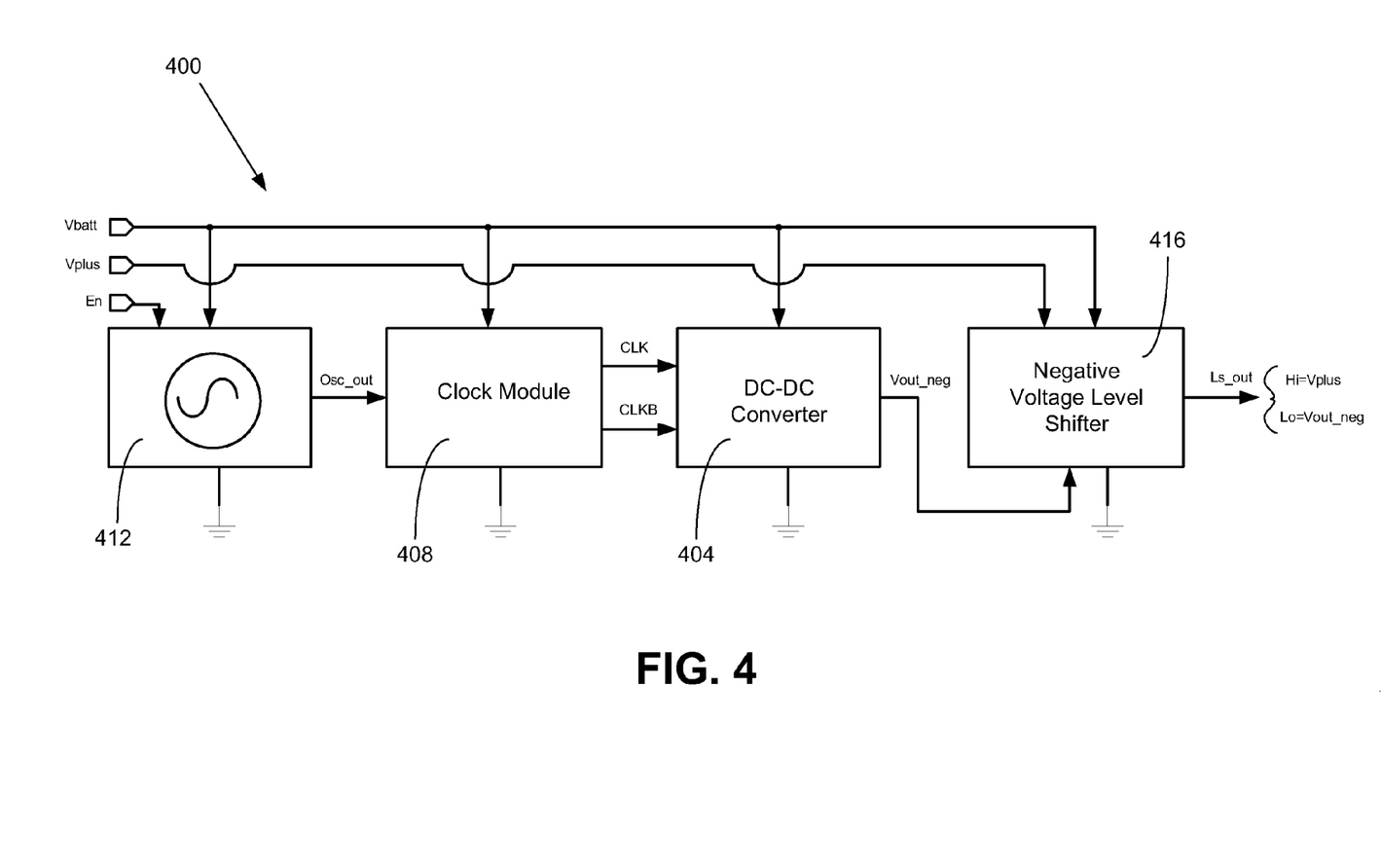
FIG. 4 illustrates a block diagram of a control signal generation system incorporating the circuit of FIG. 1 and/or FIG. 3.

The DC-DC converters 100 and 300 of FIGS. 1 and 3, respectively, may be incorporated into a variety of apparatuses and systems. For example, FIG. 4 illustrates a block diagram of a control signal generator 400 having a DC-DC converter 404. The DC-DC converter 404 may be similar to DC-DC converter 100 and/or DC-DC converter 300. The control signal generator 400 is configured to produce complementary control signals to drive an RF switch. The DC-DC converter 404 receives a non-overlapping clock signal, including first clock signal, CLK, and second clock signal, CLKB, from clock module 408. Clock module 408 may produce the non-overlapping clock signal using an oscillator 412. The output voltage of the DC-DC converter 404 may be coupled with a negative voltage level shifter 416. The negative voltage level shifter 416 may receive the output voltage and produce the complementary control signals used to drive the RF switch. For example, negative voltage level shifter 416 may generate a first control signal and a second control signal based on the output voltage of the negative DC-DC converter. The second control signal may have a polarity opposite a polarity of the first control signal and a magnitude substantially equal to the magnitude of the first control signal. In some embodiments, the voltage of the first control signal may be substantially equal to the output voltage of DC-DC converter 404.

Figure 5:
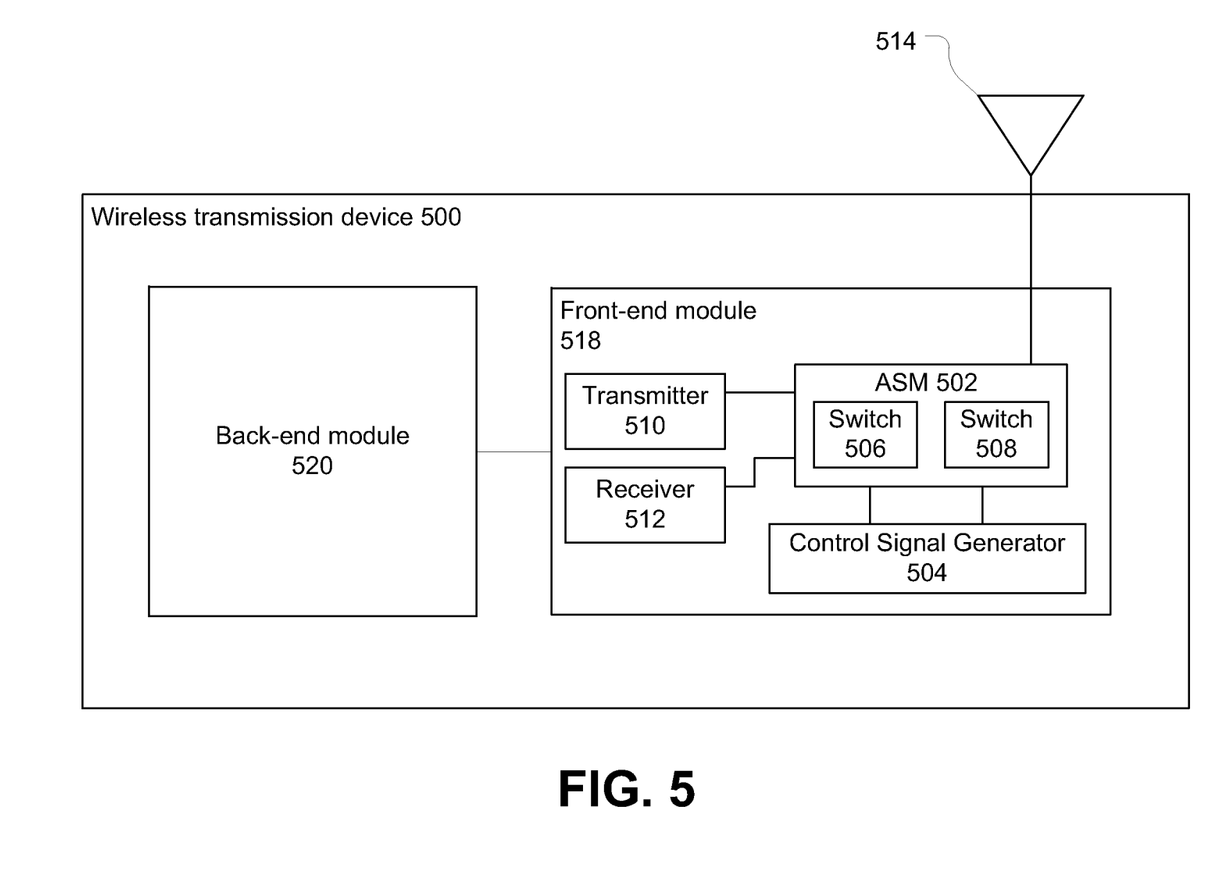
FIG. 5 illustrates a block diagram of an exemplary wireless transmission device incorporating the circuit of FIG. 1, FIG. 3, and/or FIG. 4.

A block diagram of an exemplary wireless transmission device 500 incorporating the DC-DC converters 100 and/or 300 in a control signal generator 400 (represented as control signal generator 504) is illustrated in FIG. 5. The wireless transmission device 500 may have a front-end module 518 and a back-end module 520. The wireless transmission device 500 may further include an antenna switch module (ASM) 502 coupled with an antenna structure 514. The ASM 502 may include a first switch 506 and a second switch 508.

Control signal generator 504 may provide complementary first and second control signals to operate the first switch 506 and second switch 508 of ASM 502. The ASM 502 may have a first operational state and a second operational state. In the first operational state, the first control signal may switch on the first switch 506 and switch off the second switch 508. Conversely, during the second operational state, the second control signal may switch off the first switch 506 and switch on the second switch 508.

In various embodiments, the wireless transmission device 500 may further include a transmitter 510 for transmitting RF signals via antenna structure 514, and a receiver 512 for receiving RF signals via antenna structure 514. During the first operational state of the ASM 502, the first switch 506 may selectively couple at least one of the transmitter 510 and the receiver 512 with the antenna structure 514.

In some embodiments, the first switch 506 may couple both the transmitter 510 and the receiver 512 with the antenna structure 514 during the first operational state, allowing both transmitting and/or receiving of RF signals. In these embodiments, during the second operational state, the first switch 506 may uncouple the transmitter 510 and receiver 512 from the antenna 514, and the second switch may couple the antenna 514 with a shunt path. In some embodiments, transmitter 510 and receiver 512 may be integrated into the same component, such as a transceiver.

In other embodiments, the transmitter 510 may be coupled with antenna 514 by the first switch 506 during the first operational state, and the receiver 512 may be coupled with antenna 514 by the second switch 508 during the second operational state. Accordingly, RF signals may be transmitted during the first operational state, and may be received during the second operational state.

In various embodiments, the wireless transmission device 500 may be, but is not limited to, a mobile telephone, a paging device, a personal digital assistant, a text-messaging device, a portable computer, a desktop computer, a telecommunications base station, a subscriber station, an access point, a radar, a satellite communication device, or any other device capable of wirelessly transmitting RF signals.

In various embodiments, the front-end module 518 may receive a digital baseband signal representing outgoing data (e.g., voice data, web data, e-mail, signaling data, etc.) from the back-end module 520 and may perform various front-end operations to facilitate transmission of a corresponding RF signal. The front-end operations may include, but are not limited to, generating an RFout signal representative of the digital baseband signal, amplifying the generated signal, and/or forwarding the amplified RF signal to the antenna structure 514 (e.g., through a duplexer) for an over-the-air (OTA) transmission.

In a similar manner, the front-end module 518 may receive an incoming OTA signal from the antenna structure 514 (e.g., through the duplexer). The front-end module 518 may also process and send the incoming signal to the back-end module 520 for further processing. The front-end module 518 may also perform one or more other operations associated with front-end processing of RF signals.

In various embodiments, the antenna structure 514 may include one or more directional and/or omnidirectional antennas, including, e.g., a dipole antenna, a monopole antenna, a patch antenna, a loop antenna, a microstrip antenna or any other type of antenna suitable for OTA transmission/reception of RF signals.

The back-end module 520 may perform one or more back-end operations of the wireless transmission device 500 including, but not limited to, processing of digital baseband signals. For example, the back-end module 520 may control and/or process digital baseband signals that correspond to RF signals received from or transmitted to the front-end module 518.

In various embodiments, the ASM 502 may be associated with, or included in, any of the components of the front-end module 518. For example, although not illustrated in FIG. 5, in various embodiments, the ASM 502 may be associated with, or included in, a duplexer included in the front-end module 518, and may be configured to selectively switch RF signals from or to the antenna structure 514. In various other embodiments, although not illustrated in FIG. 5, the ASM 502 may be associated with, or included in, the transmitter 510, an amplifier, and/or the receiver 512 of the front-end module 518.

Although the present disclosure has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present disclosure. Those with skill in the art will readily appreciate that the teachings of the present disclosure may be implemented in a wide variety of embodiments. This description is intended to be regarded as illustrative instead of restrictive.

What is claimed is:

1. A circuit comprising:
a first p-type metal oxide semiconductor (PMOS) transistor having a source coupled with a first node, a gate coupled with a second node, and a drain coupled with a first input terminal;
a second PMOS transistor having a source coupled with the second node, a gate coupled with the first node, and a drain coupled with a second input terminal;
a first n-type metal oxide semiconductor (NMOS) transistor having a drain coupled with the first node, a gate coupled with the second node, and a source coupled with a first output terminal;
a second NMOS transistor having a drain coupled with the second node, a gate coupled with the first node, and a source coupled with a second output terminal;
a first capacitor coupled with the first node and a third node to receive a first clock signal; and
a second capacitor coupled with the second node and a fourth node to receive a second clock signal.

2. The circuit of claim 1 wherein at least one of the first and second NMOS transistors comprise a triple-well NMOS transistor.

3. The circuit of claim 1 wherein the first input terminal and the second input terminal are coupled with a ground terminal.

4. The circuit of claim 3 further comprising a clock module configured to provide the first clock signal and the second clock signal, the first clock signal and second clock signal each alternating between a ground voltage and a first voltage, the first and second clock cycles having non-overlapping clock pulses over a clock cycle;
wherein the circuit is configured to receive an input voltage between the first input terminal and the second input terminal and produce an output voltage between the first output terminal and the second output terminal that has a negative polarity and a magnitude that is substantially equal to the first voltage.

5. The circuit of claim 4 further comprising:
a first charge pump including the first and second PMOS transistors, the first and second NMOS transistors, and the first and second capacitors;

a plurality of charge pumps including the first charge pump, the plurality of charge pumps coupled together in series, wherein individual charge pumps of the plurality of charge pumps are configured to receive an input voltage and produce an output voltage that is more negative than the received input voltage by the magnitude of the first voltage.

6. The circuit of claim 1 further comprising a voltage level shifter configured to receive an output from the circuit and configured to generate a first control signal and a second control signal, the second control signal having the opposite polarity and a substantially equal magnitude as the first control signal.

7. A negative voltage generator comprising:
a clock module configured to provide a first clock signal alternating between a ground voltage and a first voltage and a second clock signal alternating between the ground voltage and the first voltage, the first and second clock cycles having non-overlapping clock pulses over a clock cycle; and
a direct current to direct current (DC-DC) converter, coupled with the clock module, the DC-DC converter including one or more charge pumps having complementary metal-oxide-semiconductor (CMOS) devices and the DC-DC converter configured to receive an input voltage at an input node, the first clock signal at a first clock terminal, and the second clock signal at a second clock terminal;
wherein the DC-DC converter is configured to produce an output voltage over the clock cycle that has a negative polarity with a magnitude substantially equal to a sum of magnitudes of the input voltage and an integer multiple of the first voltage, the integer multiple being equal to a number of the one or more charge pumps in the DC-DC converter, wherein a first charge pump of the one or more charge pumps includes:
a first p-type metal oxide semiconductor (PMOS) transistor having a source coupled with a first node, a gate coupled with a second node, and a drain coupled with a first input terminal;
a second PMOS transistor having a source coupled with the second node, a gate coupled with the first node, and a drain coupled with a second input terminal;
a first n-type metal oxide semiconductor (NMOS) transistor having a drain coupled with the first node, a gate coupled with the second node, and a source coupled with a first output terminal;
a second NMOS transistor having a drain coupled with the second node, a gate coupled with the first node, and a source coupled with a second output terminal;
a first capacitor coupled with the first node and the first clock terminal to receive the first clock signal; and
a second capacitor coupled with the second node and the second clock terminal to receive the second clock signal.

8. The negative voltage generator of claim 7, wherein the input node is coupled with a ground terminal.

9. The negative voltage generator of claim 7, wherein the CMOS devices comprise a plurality of transistors with each of the plurality of transistors configured to manifest a gate-source junction voltage and a gate-drain junction voltage that is equal to or less than the first voltage of the clock module throughout the clock cycle.

10. The negative voltage generator of claim 7, wherein the DC-DC converter comprises a first charge pump and further comprises:
a second charge pump coupled with the first charge pump and the clock module and configured to receive a first charge pump output voltage from the first charge pump, and the first clock signal and the second clock signal from the clock module;
wherein the second charge pump is configured to produce a second charge pump output voltage over the clock cycle that has a negative polarity with a magnitude substantially equal to the sum of the magnitudes of the first charge pump output voltage and the first voltage.

11. The negative voltage generator of claim 10 wherein the first charge pump and second charge pump each include a first clock terminal and a second clock terminal, and further wherein the first charge pump is configured to receive the first clock signal at the first clock terminal and the second clock signal at the second clock terminal, and the second charge pump is configured to receive the first clock signal at the second clock terminal and the second clock signal at the first clock terminal.

12. The negative voltage generator of claim 7, wherein the DC-DC converter comprises:
a plurality of charge pumps coupled together in series, each of the plurality of charge pumps configured to receive an input voltage and produce an output voltage that is more negative than the received input voltage by the magnitude of the first voltage.

13. The negative voltage generator of claim 7, further comprising a voltage-level shifter coupled with the DC-DC converter and configured to generate a first control signal and a second control signal based on the output voltage of the DC-DC converter, the second control signal having a polarity opposite a polarity of the first control signal and a magnitude equal to the magnitude of the first control signal.

14. A wireless device comprising:
an antenna;
a transmitter;
a receiver;
an antenna switch module including a first switch and a second switch, the antenna switch module configured to selectively couple at least one of the transmitter and the receiver with the antenna, via the first switch, during a first operational state;
a control signal generator configured to provide a first control signal to switch on the first switch and switch off the second switch during the first operational state and a second control signal to switch off the first switch and switch on the second switch during a second operational state, the control signal generator including:
a clock module configured to provide a first clock signal alternating between a ground voltage and a first voltage and a second clock signal alternating between a ground voltage and the first voltage, the second clock cycle having a clock pulse that does not overlap with a clock pulse of the first clock signal over a clock cycle;
a direct current to direct current (DC-DC) converter, coupled with the clock module, having complementary metal-oxide-semiconductor (CMOS) devices and configured to receive an input voltage at an input node, the first clock signal at a first clock terminal, and the second clock signal at a second clock terminal, the negative DC-DC converter configured to produce an output voltage over the clock cycle that has a negative polarity with a magnitude substantially equal to a sum of magnitudes of the input voltage and an integer multiple of the first voltage; and a voltage level shifter configured to receive the output voltage and generate the first control signal and second control signal, wherein the DC-DC converter includes:
a first p-type metal oxide semiconductor (PMOS) transistor having a source coupled with a first node, a gate coupled with a second node, and a drain coupled with a first input terminal;
a second PMOS transistor having a source coupled with the second node, a gate coupled with the first node, and a drain coupled with a second input terminal;
a first n-type metal oxide semiconductor (NMOS) transistor having a drain coupled with the first node, a gate coupled with the second node, and a source coupled with a first output terminal;
a second NMOS transistor having a drain coupled with the second node, a gate coupled with the first node, and a source coupled with a second output terminal;
a first capacitor coupled with the first node and the first clock terminal to receive the first clock signal; and
a second capacitor coupled with the second node and the second clock terminal to receive the second clock signal.

15. The wireless device of claim 14 wherein the first control signal is substantially equal to the output voltage of the DC-DC converter, and the second control signal has the opposite polarity and a substantially equal magnitude as the first control signal.

16. The wireless device of claim 14 wherein the input node is coupled with a ground terminal.

17. The wireless device of claim 14 wherein the CMOS devices comprise a plurality of transistors with each of the plurality of transistors configured to manifest a gate-source junction voltage and a gate-drain junction voltage that is equal to or less than the first voltage of the clock module throughout the clock cycle.

* * * * *